(12) United States Patent
Yu et al.

(10) Patent No.: US 9,918,275 B2
(45) Date of Patent: Mar. 13, 2018

(54) METHOD AND SYSTEM FOR WAKING SLEEPING TRUNKING TERMINAL UP

(71) Applicant: Beijing Xinwei Telecom Technology Inc., Beijing (CN)

(72) Inventors: Xixi Yu, Beijing (CN); Chunying Tang, Beijing (CN); Ruifeng Xu, Beijing (CN)

(73) Assignee: Beijing Xinwei Telecom Technology Inc., Beijing (CN)

( * ) Notice: Subject to any disclaimer, the term of this patent is extended or adjusted under 35 U.S.C. 154(b) by 395 days.

(21) Appl. No.: 14/898,317

(22) PCT Filed: Jun. 28, 2013

(86) PCT No.: PCT/CN2013/078350
§ 371 (c)(1),
(2) Date: Dec. 14, 2015

(87) PCT Pub. No.: WO2014/044069
PCT Pub. Date: Mar. 27, 2014

(65) Prior Publication Data
US 2016/0119871 A1  Apr. 28, 2016

(30) Foreign Application Priority Data
Sep. 21, 2012  (CN) .......................... 2012 1 0356241

(51) Int. Cl.
*G08C 17/00* (2006.01)
*H04W 4/00* (2009.01)
(Continued)

(52) U.S. Cl.
CPC ......... *H04W 52/0219* (2013.01); *H04W 4/08* (2013.01); *H04W 52/0216* (2013.01); *Y02B 60/50* (2013.01)

(58) Field of Classification Search
None
See application file for complete search history.

(56) References Cited

U.S. PATENT DOCUMENTS

| | | | | |
|---|---|---|---|---|
| 5,404,355 A | * | 4/1995 | Raith | .................... H04W 48/12 340/7.24 |
| 2004/0042438 A1 | * | 3/2004 | Jiang | .................... H04W 84/08 370/342 |

(Continued)

FOREIGN PATENT DOCUMENTS

| | | |
|---|---|---|
| CN | 1846373 A | 10/2006 |
| CN | 102143562 A | 8/2011 |

OTHER PUBLICATIONS

International Search Report issued in corresponding International Application No. PCT/CN2013/078350, dated Sep. 26, 2013 (4 pages).

*Primary Examiner* — Lonnie Sweet
(74) *Attorney, Agent, or Firm* — Bookoff McAndrews, PLLC

(57) ABSTRACT

The present disclosure discloses a method and system for waking a sleeping trunking terminal. A trunking terminal determines whether to enter a sleeping mode in a standby status, calculates a waking monitoring time point of the group according to the group sleeping parameter of the group, enters the sleeping mode at a sleeping start time point of the trunking terminal, wakes up and monitors whether a group paging message is received at the waking monitoring time point of the group, wakes up, joins the group and monitors a group downlink sharing channel when the group paging message is received, and continues sleeping when the group paging message is not received. In a network side, a trunking switching center transmits a group establishment message to a base station. The base station calculates the (Continued)

waking monitoring time point, and transmits the group paging message at the waking monitoring time point.

19 Claims, 2 Drawing Sheets

(51) Int. Cl.
*H04W 52/02* (2009.01)
*H04W 4/08* (2009.01)

(56) References Cited

U.S. PATENT DOCUMENTS

| | | | |
|---|---|---|---|
| 2009/0227255 A1 | 9/2009 | Thakare | |
| 2010/0105351 A1* | 4/2010 | Xu | H04W 68/00 455/404.1 |
| 2011/0134893 A1* | 6/2011 | Park | H04W 68/02 370/336 |

\* cited by examiner

METHOD AND SYSTEM FOR WAKING SLEEPING TRUNKING TERMINAL UP

CROSS-REFERENCE TO RELATED APPLICATIONS

This application is the U.S. National Phase application under 35 U.S.C. 371 of International Application PCT/CN2013/078350, which claims the benefit of priority to Chinese Patent Application No. 201210356241.0, filed on Sep. 21, 2012, the entire contents of which, for each of the aforementioned applications, are hereby incorporated by reference.

FIELD OF THE DISCLOSURE

The present disclosure relates to trunking communication fields, and more particularly, to a method and system for waking a sleeping trunking terminal up.

BACKGROUND OF THE DISCLOSURE

An idle standby trunking terminal can enter a sleeping mode in order to save power. When a group paging arrives, a base station may wake the trunking terminal up for access to perform service transmission.

FIG. 1 is a schematic diagram illustrating a process for making a trunking terminal sleeping and waking the trunking terminal up according to the prior art. As shown in FIG. 1, in the prior art, a process for making a trunking terminal sleeping and waking the trunking terminal up includes procedures as follows.

At block 1, a trunking terminal performs a trunking registration process.

At block 2, after a group paging ends, the trunking terminal enters standby, and determines whether to enter a sleeping mode according to standby time duration.

At block 3, the trunking terminal performs a sleeping request negotiation process with the base station and obtains a waking monitoring time point of a group to which the trunking terminal belongs.

At block 4, the trunking terminal enters sleeping at a sleeping start time point, and wakes up to perform monitoring at the waking monitoring time point, when a group paging message is not received during the monitoring process, the trunking terminal continues sleeping.

At block 5, when a calling party in the group initiates a group paging, a trunking switching center transmits a group paging establishment message to trunking.

At block 6, the base station transmits the group paging message to trunking terminal at the waking monitoring time point.

At block 7, the trunking terminal wakes up, joins the group, and monitors a group downlink sharing channel.

In a process of implementing the present disclosure, applicants find technical problems in the prior art at least as follows.

In block 3, when entering the sleeping mode, the trunking terminal transmits a sleeping request message to consult with the base station. After receiving a sleeping request response message from the base station to obtain the waking monitoring time point of the group to which the trunking terminal belongs, the trunking terminal enters the sleeping mode. In the sleeping consultation process, preparation time of the trunking terminal to enter the sleeping mode is in demand. When a wireless link condition suddenly becomes bad, receiving delay of the sleeping request message or the sleeping request response message may be caused, even the sleeping request message or the sleeping request response message is lost. Thus, it is caused that sleeping preparation time is long, even that the trunking terminal fails to enter the sleeping mode, and a power-saving intention cannot be achieved.

SUMMARY OF THE DISCLOSURE

A method and system for waking a sleeping trunking terminal up is provided according to embodiments of the present disclosure, so as to decrease sleeping preparation time, improve sleeping efficiency, and further to save power.

In order to implement the intention above, the present disclosure includes technical solutions as follows.

A method for waking a sleeping trunking terminal includes steps a1-a5 performed by a trunking terminal:

a1, obtaining a group sleeping parameter of a group to which the trunking terminal belongs;

a2, determining whether to enter a sleeping mode in a standby status;

a3, calculating a waking monitoring time point of the group to which the trunking terminal belongs according to the group sleeping parameter of the group to which the trunking terminal belongs;

a4, entering the sleeping mode at a sleeping start time point of the trunking terminal, waking up and monitoring whether a group paging message is received at the waking monitoring time point of the group to which the trunking terminal belongs;

a5, waking, joining the group and monitoring a group downlink sharing channel when the group paging message is received, continuing sleeping when the group paging message is not received;

the method further includes steps b1 and b2 performed by a network side;

b1, transmitting, by a trunking switching center, a group establishment message to a base station;

b2, calculating, by the base station, the waking monitoring time point, and transmitting the group paging message at the waking monitoring time point.

The trunking terminal belongs to more than one group;

the process in step a1 includes:

obtaining the group sleeping parameter of each group to which the trunking terminal belongs;

the process in step a3 includes:

calculating the waking monitoring time point of each group to which the trunking terminal belongs according to the group sleeping parameter of the group;

the process in step a4 comprises:

entering the sleeping mode at the sleeping start time point of the trunking terminal, waking up and monitoring whether the group paging message is received at the waking monitoring time point of each group to which the trunking terminal belongs.

In the method, obtaining the group sleeping parameter of the group to which the trunking terminal belongs comprises:

obtaining, by the trunking terminal, the group sleeping parameter of the group to which the trunking terminal belongs in a trunking registration process; or obtaining, by the trunking terminal, the group sleeping parameter of the group to which the trunking terminal belongs in a process that a trunking scheduling entity configures the group to the trunking terminal.

The group sleeping parameter is configured by the trunking switching center or a trunking scheduling entity.

The group sleeping parameter includes a group sleeping period and a group sleeping identifier uniquely corresponding to the group.

The group sleeping identifier uniquely corresponding to the group is a group identifier.

The group sleeping parameter is carried in the group paging establishment message in step b1.

The base station obtains the group sleeping parameter in a trunking registration process.

The group paging message comprises a group paging message postponed being transmitted.

The sleeping start time point is different from the waking monitoring time point.

In the method, determining whether to enter the sleeping mode in step a2 includes:

determining, by the trunking terminal, whether to enter the sleeping mode according to a standby time duration of the trunking terminal.

In the method, monitoring whether the group paging message is received in step a4 comprises:

monitoring, by the trunking terminal, a common channel used for transmitting the group paging message in a monitoring system to monitoring whether the group paging message is received.

The base station calculating the waking monitoring time point in step b2 includes:

calculating, by the base station, the waking monitoring time point according to the group sleeping parameter.

A system for waking a sleeping trunking terminal, comprising a first module, a second module and a third module, wherein the first module is configured in a trunking terminal, and comprises a first sub-module, a second sub-module, a third sub-module, a fourth sub-module and a fifth sub-module, the first sub-module, to obtain a group sleeping parameter of a group to which the trunking terminal belongs;

the second sub-module, to determine whether to enter a sleeping mode in a standby status;

the third sub-module, to calculate a waking monitoring time point of the group to which the trunking terminal belongs according to the group sleeping parameter of the group to which the trunking terminal belongs;

the fourth sub-module to enter the sleeping mode at a sleeping start time point of the trunking terminal, wake up and monitor whether a group paging message is received at the waking monitoring time point of the group to which the trunking terminal belongs;

the fifth sub-module, to wake up, join the group and monitor a group downlink sharing channel when the group paging message is received, continue sleeping when the group paging message is not received;

the second module configured in a trunking switching center, to transmit a group establishment message to a base station;

the third module configured in the base station, to calculate the waking monitoring time point, and transmit the group paging message at the waking monitoring time point.

The trunking terminal belongs to more than one group;

the first sub-module is to obtain the group sleeping parameter of each group to which the trunking terminal belongs;

the third sub-module is to calculate the waking monitoring time point of each group to which the trunking terminal belongs according to the group sleeping parameter of the group;

the fourth sub-module is to enter the sleeping mode at the sleeping start time point of the trunking terminal, wake up and monitor whether the group paging message is received at the waking monitoring time point of each group to which the trunking terminal belongs.

The first sub-module is to:

obtain the group sleeping parameter of the group to which the trunking terminal belongs in a trunking registration process; or obtain the group sleeping parameter of the group to which the trunking terminal belongs in a process that a trunking scheduling entity configures the group to the trunking terminal.

The group sleeping parameter comprises a group sleeping period and a group sleeping identifier uniquely corresponding to the group.

The group sleeping identifier uniquely corresponding to the group is a group identifier.

The group sleeping parameter is carried in the group paging establishment message transmitted from the second module to the base station.

The third module is further to obtain the group sleeping parameter in a trunking registration process.

The group paging message comprises a group paging message postponed being transmitted.

The sleeping start time point is different from the waking monitoring time point.

The second sub-module is to determine whether to enter the sleeping mode according to a standby time duration of the trunking terminal.

The fourth sub-module is to monitor a common channel used for transmitting the group paging message in a monitoring system to monitoring whether the group paging message is received.

The third module is to calculate the waking monitoring time point according to the group sleeping parameter.

Compared with the prior art, the trunking terminal and the base station according to embodiments of the present disclosure can obtain the group sleeping parameter without an additional interactive process. The base station and the trunking terminal can calculate the waking monitoring time point according to the group sleep parameter, so as to ensure time consistency in a trunking terminal sleeping process. Thus, when the sleeping mode is to be entered, the process of sleeping request negotiation with the base station is not in demand, so as to avoid that wireless channel resource is occupied by message interaction in the process and to avoid losing messages to cause sleeping failure. Further, sleeping preparation time is decreased, sleeping efficiency is improved, and power is saved.

DETAILED DESCRIPTION OF THE DISCLOSURE

The following clearly and completely describes the technical solutions in the embodiments of the present disclosure with reference to the accompanying drawings in the embodiments of the present disclosure. Apparently, the described embodiments are some rather than all of the embodiments of the present disclosure. All other embodiments obtained by a person of ordinary skill in the art based on the embodiments of the present disclosure without creative efforts shall fall within the protection scope of the present disclosure.

Figure 1:
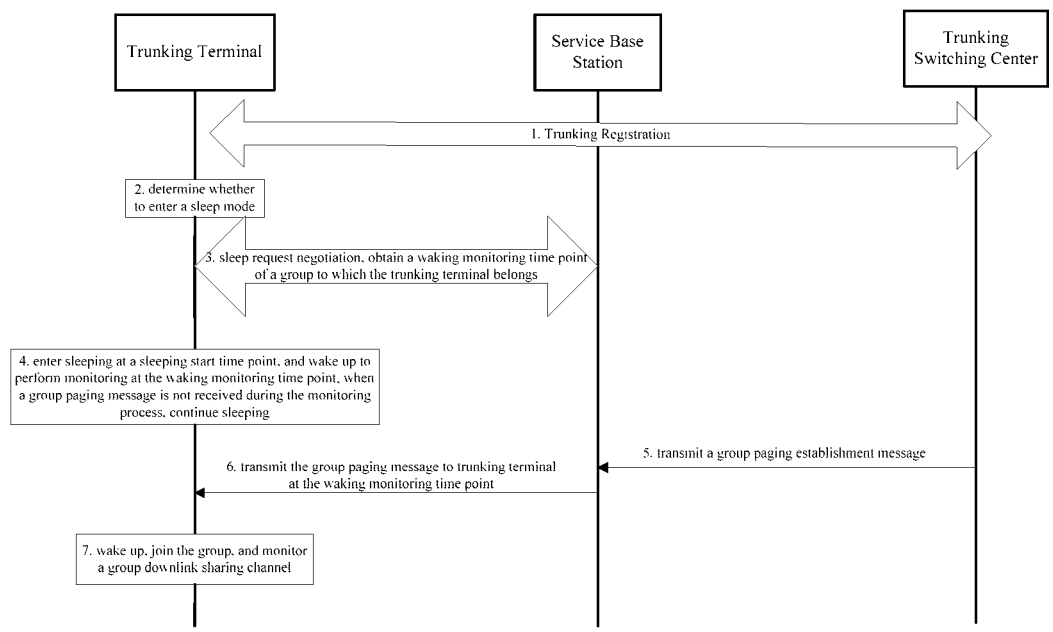
FIG. 1 is a schematic diagram illustrating a process of waking a sleeping trunking terminal in the prior art.
Figure 2:
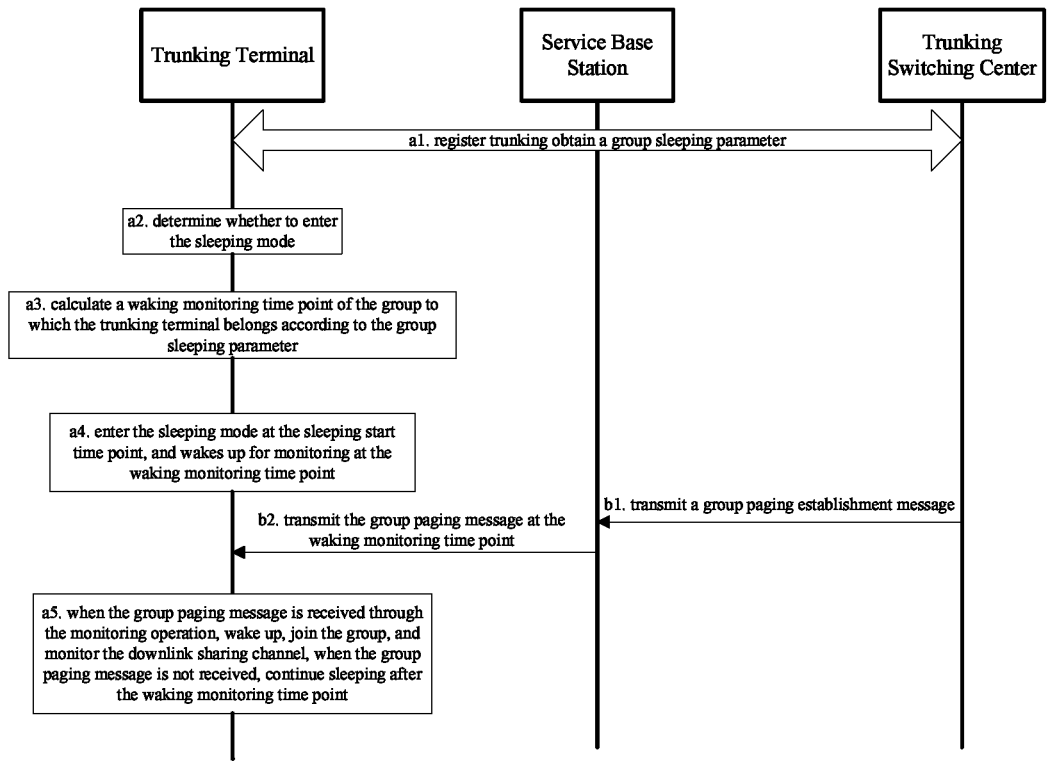
FIG. 2 is a schematic diagram illustrating a method for waking a sleeping trunking terminal up according to an embodiment of the present disclosure.

A method for making a trunking terminal sleeping and waking the trunking terminal up is implemented as shown in FIG. 2 according to an embodiment of the present disclosure. Involved network entities include a trunking terminal, a base station and a trunking switching center. The method includes procedures as follows. Procedures in blocks a1-a5 are performed by the trunking terminal, and procedures in blocks b1-b2 are performed by network sides containing a service base station and the trunking switching center.

At block a1, the trunking terminal obtains a group sleeping parameter of a group to which the trunking terminal belongs.

The group sleeping parameter may be configured by the trunking switching center or a trunking scheduling entity. The trunking terminal obtains the group sleeping parameter of the group to which the trunking terminal belongs. In particular, the trunking terminal obtains the group sleeping parameter of the group to which the trunking terminal belongs from the trunking switching center in a trunking registration process; or the trunking terminal may obtain the group sleeping parameter of the group to which the trunking terminal belongs in a process that the trunking scheduling entity configures the trunking terminal with the group to which the trunking terminal belongs.

Moreover, when the trunking terminal belongs to multiple groups, the trunking terminal obtains the group sleeping parameter of each group in block a1. The group sleeping parameter includes a group sleeping identifier uniquely corresponding to the group and a group sleeping period. The group sleeping identifier uniquely corresponding to the group may be a specific group sleeping identifier, or may be a group identifier, i.e., the group identifier may substitute for the group sleeping identifier. When the trunking terminal belongs to the multiple groups, the group sleeping time periods of the groups may be different from each other.

At block a2, the trunking terminal determines whether to enter the sleeping mode.

The trunking terminal enters a standby status after a group paging ends, and determines whether to enter the sleeping mode according to a standby time duration. For example, in a Synchronous Code Division Multiple Access (SCDMA) Broadband Wireless Access system supporting a trunking service, after the group paging ends, the trunking terminal starts sleeping start timer to perform timing. When receiving the group paging in a process that the sleeping start timer performs timing, the sleeping start timer stops. When the sleeping start timer expires, the trunking terminal determines to enter the sleeping mode. A time duration when the sleeping start timer expires may be configured to the terminal when trunking scheduling entity configures the group to which the trunking terminal belongs, or may be obtained from the trunking switching center, trunking scheduling entity or the base station when the trunking terminal obtains the group sleeping parameter in the trunking registration process, or may be configured to the terminal by a network management device.

At block a3, the trunking terminal calculates a waking monitoring time point of the group to which the trunking terminal belongs according to the group sleeping parameter.

For example, in the SCDMA Broadband Wireless Access system supporting a trunking service, the trunking terminal is time synchronization with the base station, and sets a frame 10 ms as a unit in time, i.e., the trunking terminal is frame number synchronization with the base station. The trunking terminal divides a frame number of the trunking terminal by the sleeping period to obtain a remainder. When the remainder of a frame is equal to the sleeping identifier, the frame is a waking monitoring time point of the group. In the condition that the group identifier substitutes for the group sleeping identifier, an algorithm includes that the trunking terminal divides the frame number of the trunking terminal by the group sleeping period to obtain a remainder, and divides the group identifier by the group sleeping period to obtain another remainder, a frame having two same remainders is the waking monitoring time point of the group.

When the trunking terminal belongs to multiple groups, according to the method above in block a3, the waking monitoring time point of each group is calculated according to the group sleeping parameter of each group.

At block a4, the trunking terminal enters the sleeping mode at the sleeping start time point, and wakes up to monitor whether a group paging message is received at the waking monitoring time point.

The sleeping start time point may be determined by the trunking terminal. For example, in block a2, a next frame after the sleeping mode is determined to be entered is taken as the sleeping start time point. Alternatively, after the sleeping mode is determined to be entered, a random number from zero to a maximum number is generated. The frame number is divided by the number of users on line to obtain a remainder. When the remainder is equal to the random number, a frame closest to the frame with the frame number is taken as the sleeping start time point. Trunking terminals in a same group may have different sleeping start time number. The maximum number may be configured by the trunking terminal itself, or may be configured to the trunking terminal by the network management device. The sleeping start time point is different from the waking monitoring time point.

When the trunking terminal belongs to multiple groups, the trunking terminal wakes up to monitor whether the group paging message is received at the waking monitoring time point of each group. A method for monitoring whether the group paging message is received at the waking monitoring time point includes that the trunking terminal monitors whether the group paging message is received through monitoring a sharing channel used for transmitting the group paging message in a monitoring system. The group paging message includes a grouping paging message postponed being transmitted.

At block a5, when the group paging message is received through the monitoring operation, the trunking terminal wakes up, joins the group, and monitors the downlink sharing channel, when the group paging message is not received, the trunking terminal continues sleeping after the waking monitoring time point.

According to an embodiment of the present disclosure, the network side performs procedures in blocks b1-b2 as follows.

At block b1, the trunking switching center transmits a group paging establishment message to the base station.

The paging establishment message transmitted from the trunking switching center to the base station carries the group sleeping parameter. The base station records the group sleeping parameter carried in the paging establishment message. The group sleeping parameter may be configured by the trunking switching center or the trunking scheduling entity. When the group sleeping parameter may be configured by the trunking scheduling entity, the trunking switching center obtains the group sleeping parameter from the trunking scheduling entity.

At block b2, the base station calculates the waking monitoring time point of the group, and transmits the group paging message to the trunking terminal at the waking monitoring time point.

The base station calculates the waking monitoring time point of the group according to the group sleeping parameter. The calculation method is same as that in the trunking terminal, which has been described in block a3 and is not described repeatedly. The method for obtaining the group sleeping parameter to base station includes transmitting the group paging establishment message carrying the group sleeping parameter from the trunking switching center to the base station, or includes obtaining the group sleeping parameter from the trunking switching center to the base station in a trunking registration process.

Moreover, the group paging message includes a grouping paging message postponed being transmitted. In block b2, a process of transmitting the group paging message from the base station to the trunking terminal at the waking monitoring time point may not substitute for a process of transmitting the paging message from the base station in a normal group paging establishment process.

Afterwards, as described in block a5, the trunking terminal may receive the group paging message, so as to wake up, join the group and monitor the group downlink sharing channel.

According the method, the trunking terminal and the base station can obtain the group sleeping parameter without an additional interactive process. The base station and the trunking terminal may calculate the waking monitoring time point according to the group sleep parameter, so as to ensure time consistency in a trunking terminal sleeping process. Thus, when the sleeping mode is to be entered, the process of sleeping request negotiation with the base station is not in demand, so as to avoid that wireless channel resource is occupied by message interaction in the process and to avoid losing messages to cause sleeping failure. Further, sleeping preparation time is decreased, and sleeping efficiency is improved.

Figure 3:
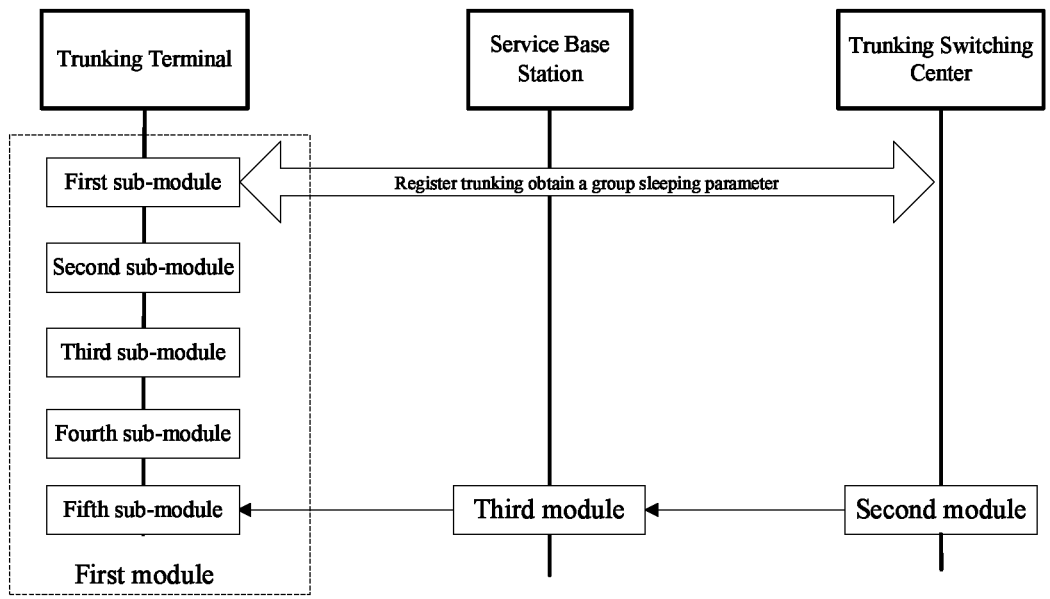
FIG. 3 is a schematic diagram illustrating a structure of a system for waking a sleeping trunking terminal up according to an embodiment of the present disclosure.

According to the method above, a system for waking a sleeping trunking terminal is provided to implement the method. FIG. 3 is a schematic diagram illustrating a structure of a system for waking a sleeping trunking terminal up according to an embodiment of the present disclosure. As shown in FIG. 3, the system for waking a sleeping trunking terminal includes a first module, a second module and a third module, wherein the first module is configured in a trunking terminal, and comprises a first sub-module, a second sub-module, a third sub-module, a fourth sub-module and a fifth sub-module.

The first sub-module is to obtain a group sleeping parameter of a group to which the trunking terminal belongs.

The group sleeping parameter may be configured by the trunking switching center or a trunking scheduling entity. The first sub-module is to obtain the group sleeping parameter of the group to which the trunking terminal belongs in a trunking registration process; or obtain the group sleeping parameter of the group to which the trunking terminal belongs in a process that a trunking scheduling entity configures the group to the trunking terminal.

Moreover, when the trunking terminal belongs to multiple groups, the first sub-module obtains the group sleeping parameter of each group. The group sleeping parameter includes a group sleeping identifier uniquely corresponding to the group and a group sleeping period. The group sleeping identifier uniquely corresponding to the group may be a specific group sleeping identifier, or may be a group identifier, i.e., the group identifier may substitute for the group sleeping identifier. When the trunking terminal belongs to the multiple groups, the group sleeping time periods of the groups may be different from each other.

The second sub-module is to determine whether to enter a sleeping mode in a standby status.

The second sub-module is to when the trunking terminal enters a standby status after a group paging ends, determines whether to enter the sleeping mode according to a standby time duration. For example, in a Synchronous Code Division Multiple Access (SCDMA) Broadband Wireless Access system supporting a trunking service, the second sub-module after the group paging ends starts sleeping start timer to perform timing, when receiving the group paging in a process that the sleeping start timer performs timing, stop the sleeping start timer, when the sleeping start timer expires, determine to enter the sleeping mode. A time duration when the sleeping start timer expires may be configured to the terminal when trunking scheduling entity configures the group to which the trunking terminal belongs, or may be obtained from the trunking switching center, trunking scheduling entity or the base station when the trunking terminal obtains the group sleeping parameter in the trunking registration process, or may be configured to the terminal by a network management device.

The third sub-module, to calculate a waking monitoring time point of the group to which the trunking terminal belongs according to the group sleeping parameter of the group to which the trunking terminal belongs;

For example, in the SCDMA Broadband Wireless Access system supporting a trunking service, the trunking terminal is time synchronization with the base station, and sets a frame 10 ms as a unit in time, i.e., the trunking terminal is frame number synchronization with the base station. The third sub-module divides a frame number of the trunking terminal by the sleeping period to obtain a remainder. When the remainder of a frame is equal to the sleeping identifier, the frame is a waking monitoring time point of the group. In the condition that the group identifier substitutes for the group sleeping identifier, an algorithm includes that the trunking terminal divides the frame number of the trunking terminal by the group sleeping period to obtain a remainder, and divides the group identifier by the group sleeping period to obtain another remainder, a frame having two same remainders is the waking monitoring time point of the group.

When the trunking terminal belongs to multiple groups, according to the method above, the waking monitoring time point of each group is calculated according to the group sleeping parameter of each group.

The fourth sub-module is to enter the sleeping mode at a sleeping start time point of the trunking terminal, wake up and monitor whether a group paging message is received at the waking monitoring time point of the group to which the trunking terminal belongs.

The sleeping start time point may be determined by the trunking terminal. For example, in block 2, a next frame after determining to enter the sleeping mode is taken as the sleeping start time point. Alternatively, after the sleeping mode is determined to be entered, a random number from zero to a maximum number is generated. The frame number is divided by the number of users on line to obtain a remainder. When the remainder is equal to the random number, a frame closest to the frame with the frame number is taken as the sleeping start time point. Trunking terminals in a same group may have different sleeping start time number. The maximum number may be configured by the trunking terminal itself, or may be configured to the trunking terminal by the network management device. The sleeping start time point is different from the waking monitoring time point.

When the trunking terminal belongs to multiple groups, the fourth sub-module wakes up to monitor whether the group paging message is received at the waking monitoring time point of each group. The fourth sub-module monitors whether the group paging message is received through monitoring a sharing channel used for transmitting the group paging message in a monitoring system. The group paging message includes a grouping paging message postponed being transmitted.

The fifth sub-module is to wake up, join the group and monitor a group downlink sharing channel when the group paging message is received, continue sleeping when the group paging message is not received.

The second module is configured in a trunking switching center, is to transmit a group establishment message to a base station.

The paging establishment message transmitted from the second module to the base station carries the group sleeping parameter. The third module in the base station records the group sleeping parameter carried in the paging establishment message.

The group sleeping parameter may be configured by the trunking switching center or the trunking scheduling entity. When the group sleeping parameter may be configured by the trunking scheduling entity, the trunking switching center obtains the group sleeping parameter from the trunking scheduling entity.

The third module is configured in the base station, is to calculate the waking monitoring time point, and transmit the group paging message at the waking monitoring time point.

The third module calculates the waking monitoring time point of the group according to the group sleeping parameter. The calculation method is same as that in the trunking terminal, which has been described in block a3 and is not described repeatedly. The method for obtaining the group sleeping parameter in the third module of the base station includes transmitting the group paging establishment message carrying the group sleeping parameter from the trunking switching center to the base station, or includes obtaining the group sleeping parameter from the trunking switching center to the base station in a trunking registration process.

Moreover, the group paging message includes a grouping paging message postponed being transmitted. A process of transmitting the group paging message from the base station to the trunking terminal at the waking monitoring time point may not substitute for a process of transmitting the paging message from the base station in a normal group paging establishment process.

Afterwards, as described in block a5, the fifth sub-module in the trunking terminal may receive the group paging message, so as to wake up, join the group and monitor the group downlink sharing channel.

In various embodiments of the present disclosure, it should be understood that the disclosed method and system can be implemented through other means. For example, the system embodiments described above are only exemplary embodiments, e.g., the modules are only divided according to logic functions, there are other dividing ways in actual implementation, e.g., multiple modules may be merged or integrated into another system, or some characteristics may be omitted, or may be not performed. In another point, displayed or discussed mutual coupling, direct coupling or communication connection can be through some interfaces, indirect coupling among modules or communication connection, and can be electric or other form.

In addition, each embodiment of the present disclosure may be implemented through a data processing device, e.g., a computer, to perform a data processing program. Obviously, the data processing program is included in the present disclosure. In addition, the data processing program usually stored in a storage medium is directly read from the storage medium or is copied to a storage device (e.g., a disk and/or a memory) in the data processing device to be performed. Thus, the storage medium is included in the present disclosure. The storage medium may use any kind of record ways, e.g., a paper storage medium (such as paper tape, etc.), a magnetic storage medium, (such as a floppy disk, hard disk, flash memory, etc.), an optical storage media (such as CD-ROM, etc.), a magneto optical storage medium (such as Mo, etc.).

The foregoing is only preferred examples of the present disclosure and is not used to limit the protection scope of the present disclosure. Any equivalent substitution according to claims of the present disclosure is within the protection scope of the present disclosure.

The invention claimed is:

1. A method for waking a sleeping trunking terminal, comprising;
   a1, obtaining, by a trunking terminal, a group sleeping parameter of a group to which the trunking terminal belongs, wherein the group sleeping parameter comprises a group sleeping period and a group sleeping identifier uniquely corresponding to the group;
   a2, determining, by the trunking terminal, whether to enter a sleeping mode in a standby status;
   a3, calculating, by the trunking terminal, a waking monitoring time point of the group to which the trunking terminal belongs according to the group sleeping parameter of the group to which the trunking terminal belongs; wherein the calculating the waking monitoring time point of the group comprises: dividing a frame number of the trunking terminal by the group sleeping period to obtain a remainder, and determining a frame having a remainder equal to the group sleeping identifier as the waking monitoring time point of the group;
   a4, entering, by the trunking terminal, the sleeping mode at a sleeping start time point of the trunking terminal, waking up and monitoring whether a group paging message is received at the waking monitoring time point of the group to which the trunking terminal belongs;
   a5, waking up, by the trunking terminal, joining the group and monitoring a group downlink sharing channel when the group paging message is received, continuing sleeping when the group paging message is not received;
   b1, transmitting, by a trunking switching center, a group establishment message to a base station;
   b2, calculating, by the base station, the waking monitoring time point, and transmitting the group paging message at the waking monitoring time point.

2. The method of claim 1, wherein the trunking terminal belongs to more than one group;
   the process in step a1 comprises:
   obtaining the group sleeping parameter of each group to which the trunking terminal belongs;
   the process in step a3 comprises:

calculating the waking monitoring time point of each group to which the trunking terminal belongs according to the group sleeping parameter of the group;

the process in step a4 comprises:

entering the sleeping mode at the sleeping start time point of the trunking terminal, waking up and monitoring whether the group paging message is received at the waking monitoring time point of each group to which the trunking terminal belongs.

3. The method of claim 1, wherein obtaining the group sleeping parameter of the group to which the trunking terminal belongs comprises:

obtaining, by the trunking terminal, the group sleeping parameter of the group to which the trunking terminal belongs in a trunking registration process; or obtaining, by the trunking terminal, the group sleeping parameter of the group to which the trunking terminal belongs in a process that a trunking scheduling entity configures the group to the trunking terminal.

4. The method of claim 1, wherein the group sleeping parameter is configured by the trunking switching center or a trunking scheduling entity.

5. The method of claim 1, wherein the group sleeping identifier uniquely corresponding to the group is a group identifier, and the calculating the waking monitoring time point of the group comprises: dividing the frame number of the trunking terminal by the group sleeping period to obtain a remainder, dividing the group identifier by the group sleeping period to obtain another remainder, and determining a frame having two same remainders as the waking monitoring time point of the group.

6. The method of claim 1, wherein the group sleeping parameter is carried in the group paging establishment message in step b1.

7. The method of claim 1, wherein the base station obtains the group sleeping parameter in a trunking registration process.

8. The method of claim 1, wherein the group paging message comprises a group paging message postponed being transmitted.

9. The method of claim 1, wherein the sleeping start time point is different from the waking monitoring time point.

10. The method of claim 1, wherein determining whether to enter the sleeping mode in step a2 comprises:

determining, by the trunking terminal, whether to enter the sleeping mode according to a standby time duration of the trunking terminal.

11. The method of claim 1, wherein monitoring whether the group paging message is received in step a4 comprises:

monitoring, by the trunking terminal, a common channel used for transmitting the group paging message in a monitoring system to monitoring whether the group paging message is received.

12. The method of claim 1, wherein the base station calculating the waking monitoring time point in step b2 comprises:

calculating, by the base station, the waking monitoring time point according to the group sleeping parameter.

13. A system for waking a sleeping trunking terminal, comprising at least one processor and at least one non-transitory storage, wherein the at least one non-transitory storage stores one or more computer readable instructions, the processor in a trunking terminal executes computer readable instructions stored in the non-transitory storage in the trunking terminal to obtain a group sleeping parameter of a group to which the trunking terminal belongs, wherein the group sleeping parameter comprises a group sleeping period and a group sleeping identifier uniquely corresponding to the group;

determine whether to enter a sleeping mode in a standby status;

calculate a waking monitoring time point of the group to which the trunking terminal belongs according to the group sleeping parameter of the group to which the trunking terminal belongs; wherein the calculating the waking monitoring time point of the group comprises: dividing a frame number of the trunking terminal by the group sleeping period to obtain a remainder, and determining a frame having a remainder equal to the group sleeping identifier as the waking monitoring time point of the group;

enter the sleeping mode at a sleeping start time point of the trunking terminal, wake up and monitor whether a group paging message is received at the waking monitoring time point of the group to which the trunking terminal belongs; and wake up, join the group and monitor a group downlink sharing channel when the group paging message is received, continue sleeping when the group paging message is not received;

the processor in a trunking switching center executes computer readable instructions stored in the non-transitory storage in the trunking switching center to transmit a group establishment message to a base station;

the processor in the base station executes computer readable instructions stored in the non-transitory storage in the base station to calculate the waking monitoring time point, and transmit the group paging message at the waking monitoring time point.

14. The system of claim 13, wherein the trunking terminal belongs to more than one group, and the processor in the trunking terminal executes the computer readable instructions stored in the non-transitory storage in the trunking terminal to obtain the group sleeping parameter of each group to which the trunking terminal belongs;

calculate the waking monitoring time point of each group to which the trunking terminal belongs according to the group sleeping parameter of the group; and enter the sleeping mode at the sleeping start time point of the trunking terminal, wake up and monitor whether the group paging message is received at the waking monitoring time point of each group to which the trunking terminal belongs.

15. The system of claim 13, wherein the processor in the trunking terminal executes the computer readable instructions stored in the non-transitory storage in the trunking terminal to:

obtain the group sleeping parameter of the group to which the trunking terminal belongs in a trunking registration process; or obtain the group sleeping parameter of the group to which the trunking terminal belongs in a process that a trunking scheduling entity configures the group to the trunking terminal.

16. The system of claim 13, wherein the processor in the base station executes the computer readable instructions stored in the non-transitory storage in the base station to obtain the group sleeping parameter in a trunking registration process.

17. The system of claim 13, wherein the processor in the trunking switching center executes the computer readable instructions stored in the non-transitory storage in the trunking switching center to determine whether to enter the sleeping mode according to a standby time duration of the trunking terminal.

18. The system of claim 13, wherein the processor in the trunking terminal executes the computer readable instructions stored in the non-transitory storage in the trunking terminal to monitor a common channel used for transmitting the group paging message in a monitoring system to monitoring whether the group paging message is received.

19. The system of claim 13, wherein the group sleeping identifier uniquely corresponding to the group is a group identifier, and the processor in the base station executes the computer readable instructions stored in the non-transitory storage in the base station to dividing the frame number of the trunking terminal by the group sleeping period to obtain a remainder, dividing the group identifier by the group sleeping period to obtain another remainder, and determining a frame having two same remainders as the waking monitoring time point of the group.

* * * * *